US012558677B2

(12) United States Patent
Cornella et al.

(10) Patent No.: US 12,558,677 B2
(45) Date of Patent: Feb. 24, 2026

(54) AIR-STABLE NI(0)-OLEFIN COMPLEXES AND THEIR USE AS CATALYSTS OR PRECATALYSTS

(71) Applicant: STUDIENGESELLSCHAFT KOHLE MBH, Muelheim (DE)

(72) Inventors: Josep Cornella, Muelheiman der Ruhr (DE); Lukas Nattmann, Muelheim an der Ruhr (DE)

(73) Assignee: STUDIENGESELLSCHAFT KOHLE MBH, Muelheim (DE)

( * ) Notice: Subject to any disclaimer, the term of this patent is extended or adjusted under 35 U.S.C. 154(b) by 561 days.

(21) Appl. No.: 17/631,792

(22) PCT Filed: Jul. 14, 2020

(86) PCT No.: PCT/EP2020/069898
§ 371 (c)(1),
(2) Date: Jan. 31, 2022

(87) PCT Pub. No.: WO2021/018572
PCT Pub. Date: Feb. 4, 2021

(65) Prior Publication Data

US 2022/0266232 A1 Aug. 25, 2022

(30) Foreign Application Priority Data

Jul. 30, 2019 (EP) .................................... 19189236
Sep. 17, 2019 (DE) ..................... 10 2019 214 138.2

(51) Int. Cl.
*B01J 31/22* (2006.01)
*B01J 31/24* (2006.01)
*C07F 15/04* (2006.01)

(52) U.S. Cl.
CPC ....... *B01J 31/2291* (2013.01); *B01J 31/2409* (2013.01); *C07F 15/04* (2013.01); *B01J 2231/348* (2013.01); *B01J 2231/4211* (2013.01); *B01J 2231/4283* (2013.01); *B01J 2531/847* (2013.01)

(58) Field of Classification Search
CPC .............. B01J 31/2291; B01J 2531/847; B01J 2531/0205; C07F 15/04
See application file for complete search history.

(56) References Cited

U.S. PATENT DOCUMENTS 4,017,526 A 4/1977 Wilke et al.

FOREIGN PATENT DOCUMENTS

DE 1 191 375 B 4/1965

OTHER PUBLICATIONS

K. Fischer, et al. B 39(8) Zeitschrift für Naturforschung 1011-1021(1984) (Year: 1984).*
PubChem CAS18869-29-9 (Year: 2018).*
Sarah Z. Tasker et al.: "Recent advances in homogeneous nickel catalysis", Nature, vol. 509, No. 7500, May 14, 2014, pp. 299-309, XP055118098.
Ohashi, M. et al., "Nickel-catalyzed, dehydrogenative [4+2] cycloaddition of 1,3-dienes with Nitriles", Journal of the American Chemical Society, 133, 18018-18021 (2011).
Shiota, H. et al., "Nickel-catalyzed chelation-assisted transformations involving ortho C—H bond activation: regioselective oxidative cycloaddition of aromatic amides to alkynes", Journal of the American Chemical Society, 133, 14952-14955 (2011).
Graham, T. et al., "Nickel-catalyzed cross-coupling of chromene acetals and boronic acids", Organic Letters, vol. 14, No. 6, 1616-1619 (2012).
Nattmann, L. et al., "An air-stable binary Ni(O)-olefin catalyst", Nature Catalysis, vol. 3, Jan. 2020, 6-13.

* cited by examiner

*Primary Examiner* — Alexander R Pagano
*Assistant Examiner* — Frank S. Hou
(74) *Attorney, Agent, or Firm* — Norris McLaughlin, PA

(57) ABSTRACT

The present invention relates to air stable, binary Ni(0)-olefin complexes and their use in organic synthesis.

4 Claims, 5 Drawing Sheets

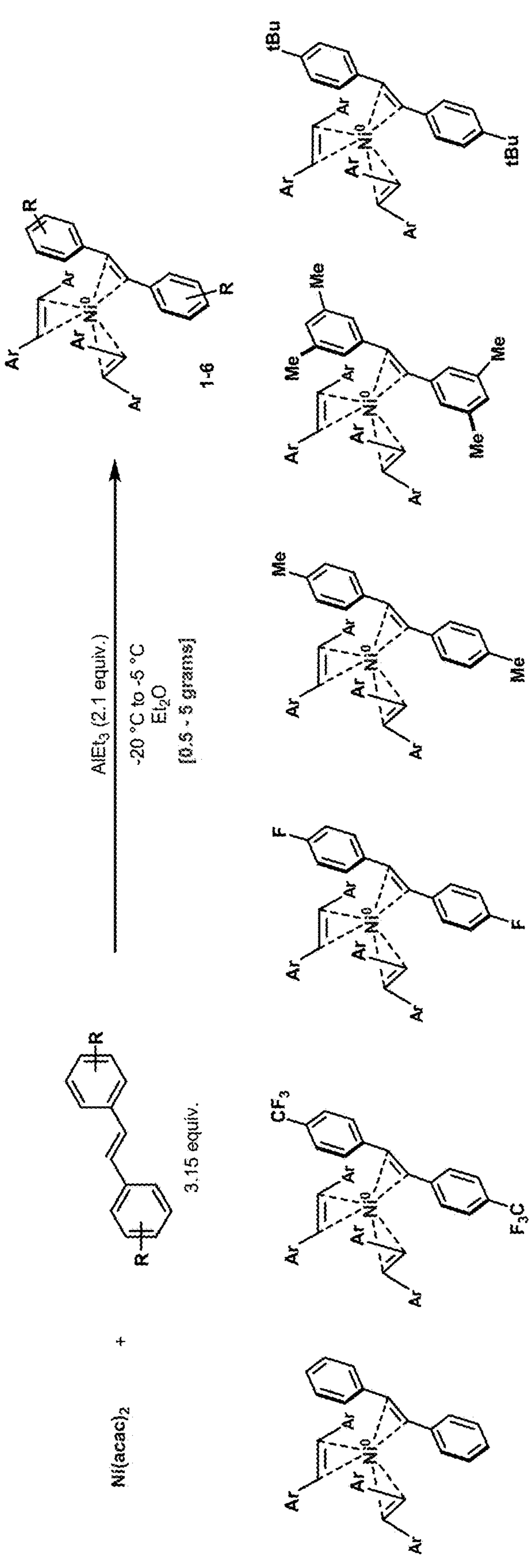

1-6

Figure 1:
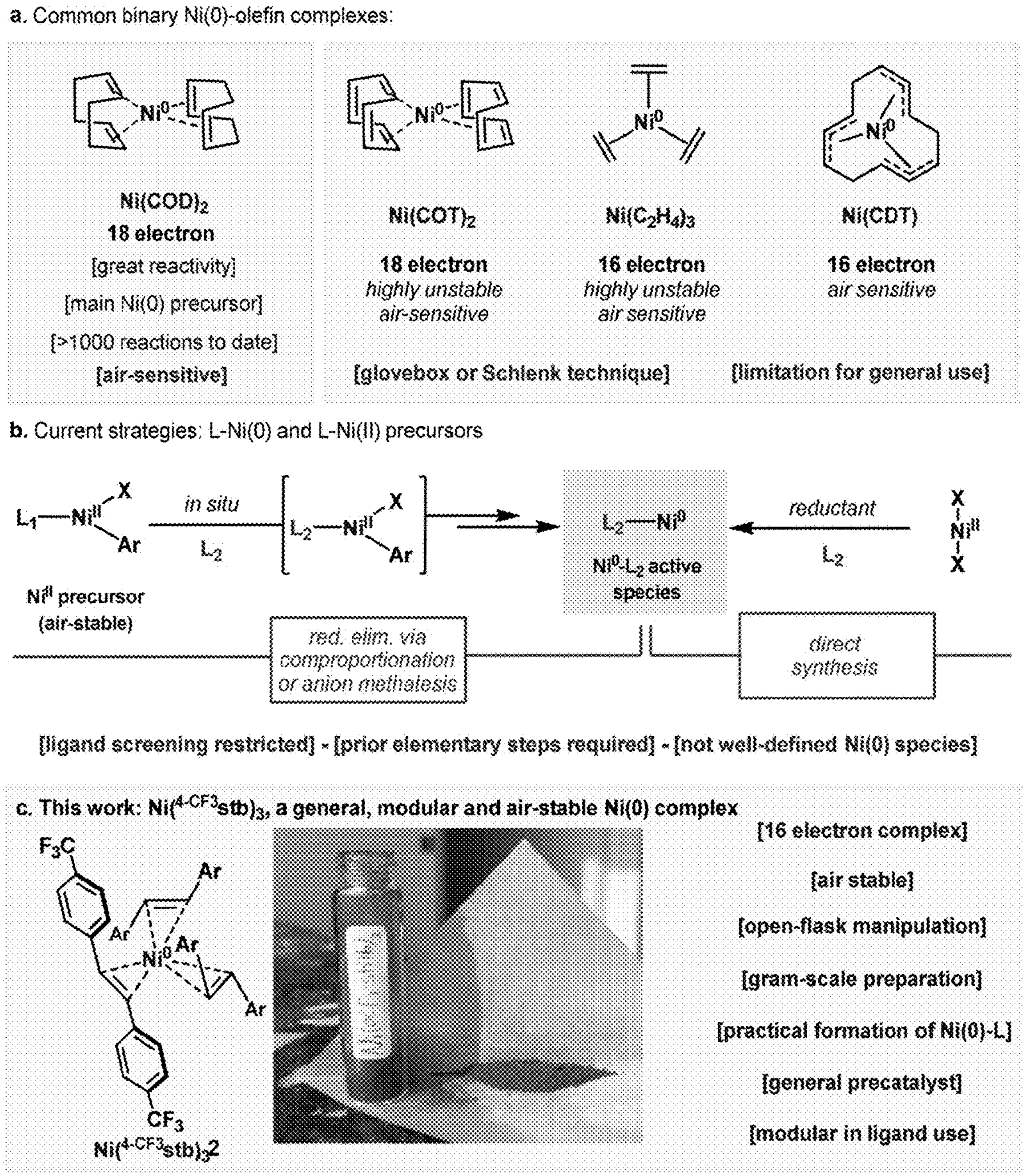

Ar = Ph
1, ($Ni(^{H}stb)_3$)
*air-stable*
*stability at -18 °C: > 3 months*
*stability at 25 °C: (<3 days*
*unstable in solution (25 °C)*

Ar = 4-$CF_3$-$C_6H_4$
2, ($Ni(^{4\text{-}CF3}stb)_3$)
*air-stable*
*stability at -18 °C: > 3 months*
*stability at 25 °C: (<1 week)*
*unstable in solution (25 °C)*

Ar = 4-F-$C_6H_4$
3, ($Ni(^{4\text{-}F}stb)_3$)
*air-stable*
*stability at -18 °C: > 3 months*
*stability at 25 °C: (<1 week)*
*unstable in solution (25 °C)*

Ar = 4-Me-$C_6H_4$
4, ($Ni(^{4\text{-}Me}stb)_3$)
*air-stable*
*stability at -18 °C: > 3 months*
*stability at 25 °C: (<1 week)*
*unstable in solution (25 °C)*

Ar = 3,5-diMe-$C_6H_4$
5, ($Ni(^{Me,Me}stb)_3$)
*air-stable*
*stability at -18 °C: 1 month*
*stability at 25 °C: (<1 week)*
*unstable in solution (25 °C)*

Ar = 4-tBu-$C_6H_4$
6, ($Ni(^{4\text{-}tBu}stb)_3$)
*air-stable*
*stability at -18 °C: > 3 months*
*stability at 25 °C: 1 month*
*stable in solution (25 °C)*

Fig. 1 d 1 2

7 8 9 2 10

*Industrially Relevant Transformations*

*Coordination Chemistry*

C $Ni(COD)_2$ + $PPh_3$ (4.0 equiv.) → $Ni(COD)(PPh_3)_2$ + $Ni(PPh_3)_4$

PhMe, rt

*ratio 1:3*

AIR-STABLE NI(0)-OLEFIN COMPLEXES AND THEIR USE AS CATALYSTS OR PRECATALYSTS

This application is a 371 of International Patent Application No. PCT/EP2020/069898, filed Jul. 14, 2020, which claims priority of German Patent Application No. 10 2019 214 138.2, filed Sep. 17, 2019, and European Patent Application No. 19189236.3, filed Jul. 30, 2019, the disclosures of which patent applications are hereby incorporated herein by reference.

The present invention relates to an air stable, binary Ni(0)-olefin complexes and their use in organic synthesis.

In recent years, nickel (Ni) catalysis has become a growing and empowering area of research due to novel disconnections and reactivity modes towards organic synthesis. In these endeavors, Ni(0)-olefin complexes have become a powerful source of Ni(0) due to their high affinity for ligand exchange. For example, $Ni(COD)_2$ (bis(cyclooctadiene)Ni(0)) has become the cornerstone Ni(0) source for exploring new catalytic reactivity.

However, binary Ni(0) complexes bearing solely olefins as ligands suffer from great instability and fast decomposition when exposed to air, thus restricting its manipulation to Schlenk techniques or glovebox under inert atmosphere.

In 1960, DE 1 191 375 AS disclosed the synthesis of the first binary metal-olefin complexes as a reaction of olefins and Ni salts. Since this disclosure, Ni(0)-olefin compounds, and specifically $Ni(COD)_2$, have served as precatalysts to unfold a variety of transformations that impacted all levels of the chemical sciences. Moreover, $Ni(COD)_2$ and all-trans-Ni(CDT) have served as catalyst for various important industrial processes occurring at multi-ton scale, namely polymerization and cyclotrimerization of olefinic compounds.

However, in the context of homogeneous catalysis, $Ni(COD)_2$ has become the main, if not the only, Ni(0) source utilized for reaction discovery (FIG. 1*a*). Indeed, $Ni(COD)_2$ is commercially available due to its remarkable stability under inert atmosphere at low-temperatures. The lability of the olefinic ligands in $Ni(COD)_2$ when competing with more nucleophilic counterparts such as phosphines, diamines or carbenes has placed this compound at the vanguard of reaction discovery, thus reigning sovereign in a plethora of catalytic transformations.

However, despite its significant properties, the use of $Ni(COD)_2$ is linked to its high instability and immediate decomposition upon exposure to air, resulting in tedious manipulations and requiring the use of glovebox or Schlenk techniques. Alternative binary Ni(0)-olefin complexes are restricted to Ni(CDT) (cis or trans), $Ni(COT)_2$ or $Ni(C_2H_4)_3$ which are even more unstable and extremely air-sensitive (FIG. 1*a*).

For these reasons, the search for an alternative Ni(0) precursor which is stable under air has spurred chemists' minds for years, thus recognizing that such precatalyst would permit the development of facile and highly practical methodologies from the point of view of preparation time and reaction setup.

Indeed, the unique properties and reactivity of Ni(0)-olefin complexes are still of utmost importance and chemists have devoted great effort to manipulate such compounds under aerobic conditions, as exemplified by the development of other Ni(II) precatalysts (FIG. 1*b*) or paraffin capsules which permit the usage of $Ni(COD)_2$ in a benchtop setting.

However, there is still the need to provide a practical solution to the usage of an air-stable Ni(0) precursor.

The inventors have developed the synthesis and investigated the catalytic activity of a unique set of 16-electron binary Ni(0)-stilbene complexes as schematically represented by $Ni(^{X}stb)_3$ wherein X describes different substitution patterns.

Contrarily to all the reported 16- and 18-electron Ni(0)-olefin complexes, $Ni(^{X}stb)_3$ are stable under air for months without noticeable decomposition while stored in the freezer at −18° C. The complexes can be manipulated without the use of a glovebox or Schlenk and are highly modular, thus permitting ligand exchange with a variety of commonly employed ligands in Ni catalysis such as diamines, phosphines, N-heterocyclic carbenes (NHCs), etc, affording well-defined Ni(0)-L species. Moreover, their catalytic activity was benchmarked with that of $Ni(COD)_2$ and revealed to be excellent precursors for a wide variety of different Ni-catalyzed reactions.

The present invention is therefore directed to $Ni(R)_3$—complexes wherein Ni represents Ni(0) and R may be the same or different and represents a trans-stilbene of the Formula (I):

(I)

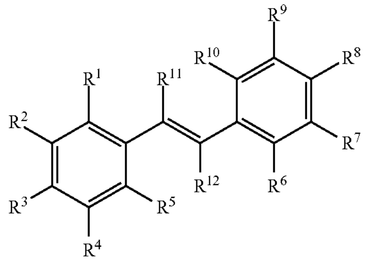

wherein $R^1$ to $R^{10}$ may be the same or different and are selected from H, Cl, Br, F, CN, $C_1$ to $C_8$ alkyl or $C_3$ to $C_6$ cycloalkyl which alkyl or cycloalkyl may optionally be substituted by one or more halogens, wherein $R^{11}$ to $R^{12}$ may be the same or different and are selected from H, $C_1$ to $C_8$ alkyl, $C^3$ to $C_6$ cycloalkyl, —O—$C_1$ to $C_8$ alkyl or —O—$C_3$ to $C_6$ cycloalkyl, with the proviso that at least one of $R^1$ to $R^{12}$ is not hydrogen.

In the inventive $Ni(R)_3$-complexes as illustrated in the present context, Ni represents Ni(0).

In another embodiment of the inventive $Ni(R)_3$—complex, R is the same or different and in Formula (I), at least one of $R^1$ to $R^5$ and at least one of $R^6$ to $R^{10}$ are the same or different and are selected from CI, Br, F, CN, $C_1$ to $C_8$ alkyl or $C_3$ to $C_6$ cycloalkyl which alkyl or cycloalkyl may optionally be substituted by one or more halogens, preferably selected from $C_1$ to $C_8$ alkyl which may optionally be branched and/or substituted by one or more halogens, and the others of $R^1$ to $R^{10}$ are hydrogen, and $R^{11}$ to $R^{12}$ may be the same or different and are selected from H, $C_1$ to $C_8$ alkyl, $C_3$ to $C_6$ cycloalkyl, —O—$C_1$ to $C_8$ alkyl or —O—$C_3$ to $C_6$ cycloalkyl.

In yet another embodiment of the inventive $Ni(R)_3$—complex, R is the same or different and in Formula (I), $R^3$ and $R^8$ are the same or different and are selected from $C_1$ to $C_8$ alkyl which alkyl or cycloalkyl may optionally be substituted by one or more halogens, and the others of $R^1$ to $R^{10}$ are hydrogen, and $R^{11}$ to $R^{12}$ may be the same or different and are selected from H, $C_1$ to $C_8$ alkyl, $C_3$ to $C_6$ cycloalkyl, —O—$C_1$ to $C_8$ alkyl or —O—$C_3$ to $C_6$ cycloalkyl.

In further embodiment of the inventive $Ni(R)_3$—complex, R is the same or different and in Formula (I), $R^3$ and $R^8$ are the same or different and are selected from branched $C_3$ to $C_8$ alkyl such as isopropyl, t-butyl, neopentyl, which may optionally be substituted by one or more halogens, and the others of $R^1$ to $R^{10}$ are hydrogen, and $R^{11}$ to $R^{12}$ may be the same or different and are selected from H, $C_1$ to $C_8$ alkyl, $C_3$ to $C_6$ cycloalkyl, —O—$C_1$ to $C_8$ alkyl or —O—$C_3$ to $C_6$ cycloalkyl.

In a yet further embodiment of the inventive $Ni(R)_3$—complex, R is the same and in Formula (I), $R^3$ and $R^8$ are the same or different and are selected from $C_1$ to $C_8$ perfluoroalkyl and the others of $R^1$ to $R^{10}$ are hydrogen, and $R^{11}$ to $R^{12}$ may be the same or different and are selected from H, $C_1$ to $C_8$ alkyl, $C_3$ to $C_6$ cycloalkyl, —O—$C_1$ to $C_8$ alkyl or —O—$C_3$ to $C_6$ cycloalkyl.

In yet another embodiment of the inventive $Ni(R)_3$—complex, R is the same and in Formula (I), $R^3$ and $R^8$ are each $C_1$ to $C_8$ perfluoroalkyl, preferably $CF_3$, and the others of $R^1$ to $R^{10}$ and $R^{11}$ to $R^{12}$ are hydrogen.

In the invention, alkyl is intended to represent any alkyl group having one to eight carbon atoms including branched alkyl groups such as methyl, ethyl, propyl, isopropyl, butyl, iso-butyl, t-butyl, pentyl, neopentyl, iso-pentyl, hexyl, iso-hexyl, heptyl, iso-heptyl, octyl, iso-octyl.

In the invention, cycloalkyl is intended to represent any cycloalkyl group having three to six carbon atoms including alkyl groups such as cyclopropyl, cyclobutyl, cyclopentyl, cyclohexyl, and substituted alkyl rings.

Every alkyl or cycloalkyl group may be substituted by one or more halogens, particularly by fluorine.

The present invention also refers to a process for preparing the inventive air-stable $Ni(R)_3$—complexes wherein Ni represents Ni(0) and R may be the same or different and represents a trans-stilbene of the Formula (I):

(I)

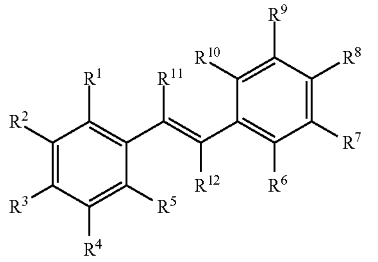

wherein $R^1$ to $R^{10}$ may be the same or different and are selected from H, Cl, Br, F, CN, $C_1$ to $C_6$ alkyl or $C_3$ to $C_6$ cycloalkyl which alkyl or cycloalkyl may optionally be substituted by one or more halogens, wherein $R^{11}$ to $R^{12}$ may be the same or different and are selected from H, $C_1$ to $C_6$ alkyl, $C_3$ to $C_6$ cycloalkyl, —O—$C_1$ to $C_6$ alkyl, or —O—$C_3$ to $C_6$ cycloalkyl, wherein Nickel (II) compound, selected from $NiF_2$, $NiCl_2$, $NiBr_2$, $NiI_2$, $Ni(OTf)_2$, $Ni(BF_4)_2$, $Ni(OTs)_2$, $Ni(glyme)Cl_2$, $Ni(glyme)Br_2$, $Ni(diglyme)Cl_2$, $Ni(diglyme)Br_2$, $Ni(NO_3)_2$, $Ni(OR^{13})_2$ (where $R^{13}$ represents —C(O)—$C_1$-$C_6$-alkyl which is optionally substituted with one or more halogen, preferably CI or F, Ni(acetyl acetonate)$_2$, $Ni(Ac)_2$ or mixtures thereof, is reacted with the trans-stilbene of Formula (I), preferably at least three equivalents, in the presence of an aluminum alkyl of the Formula $Al(R^{14})_3$, preferably at least two equivalents, wherein $R^{14}$ may be the same of different and is selected from $C_1$ to $C_6$ alkyl or $C_3$ to $C_6$ cycloalkyl.

In an embodiment of the inventive process for preparing air-stable $Ni(R)_3$—complexes as detailed before, the aluminum alkyl of the Formula $Al(R^{14})_3$ is selected from $Al(CH_3)_3$ or $Al(C_2H_5)_3$.

In yet another embodiment there is provided an inventive process for the preparation of air-stable $Ni(R)_3$—complexes disclosed herein.

In another embodiment of the inventive process, the trans-stilbene of Formula (I) is used wherein at least one of $R^1$ to $R^{12}$ is not hydrogen.

In the inventive process, the choice of the solvent is not critical as long as the solvent is an aprotic non-polar organic solvent selected from diethylether, aromatic solvents such as benzene, toluene, aliphatic hydrocarbon solvents having 5 to 8 carbon atoms, such as pentane, hexane, or mixtures thereof. The reaction conditions are also not critical and the reaction is usually carried out at a temperature between −78° C. to 0° C., preferably −30° to −5° C., under ambient pressure and optionally under an inert gas atmosphere. The reaction is usually carried out with a slight stoichiometric excess of the trans-stilbene of Formula (I), preferably at least three equivalents, and of the aluminum alkyl of the Formula $Al(R^{14})_3$, preferably at least two equivalents, each of the trans-stilbene of Formula (I) and of the aluminum alkyl of the Formula $Al(R^{14})_3$ preferably up to additional 10 mol %.

The present invention also refers to the use of the inventive air-stable $Ni(R)_3$—complexes as catalysts in organic synthesis, wherein Ni represents Ni(0) and R may be the same or different and represents a trans-stilbene of the Formula (I):

(I)

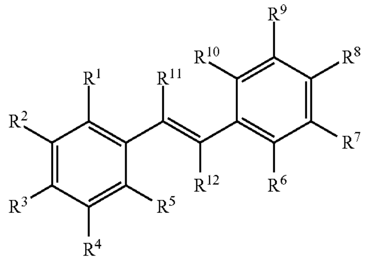

wherein $R^1$ to $R^{10}$ may be the same or different and are selected from H, Cl, Br, F, CN, $C_1$ to $C_6$ alkyl, $C_3$ to $C_6$ cycloalkyl which alkyl or cycloalkyl may optionally be substituted by one or more halogens, and $R^{11}$ to $R^{12}$ may be the same or different and are selected from H, $C_1$ to $C_8$ alkyl, $C_3$ to $C_6$ cycloalkyl, —O—$C_1$ to $C_6$ alkyl or —O—$C_3$ to $C_6$ cycloalkyl, optionally with the proviso that at least one of $R^1$ to $R^{12}$ is not hydrogen.

Catalytic Properties

Having demonstrated the ability to exchange ligands with commonly employed ligands in Ni catalysis, the inventors set out to explore the catalytic properties of the inventive Ni(0)-olefin complexes as a Ni(0) source in a variety of relevant organic transformations. To this end, the inventors benchmarked their catalysts in different Ni-catalyzed transformations as source of Ni(0), and compared the performance of the inventive Ni(0)-olefin complexes versus $Ni(COD)_2$ and some Ni(II) precatalysts. The catalytic properties were exemplarily explored with catalysts $(Ni(0)(4\text{-}^{CF3}stb)_3)$ and $(Ni(0)(^{4\text{-}tBu}stb)_3)$.

The inventors initially explored the feasibility to catalyze a Suzuki coupling due to its tremendous importance in modern synthesis. The use of the inventive Ni(0)-olefin complex as precatalyst permitted the coupling of an heteroaryl boronic acid and an heteroaryl bromide in excellent yield (FIG. 4*a*. >99%).

Another reaction of high interest is the oxidative cycloaddition between nitriles and dienes reported by Ogoshi. Despite the higher temperatures employed for the reaction (130° C.), the inventive Ni(0)-olefin complex proved stable and catalytically competent affording 84% yield of product (FIG. 4*b*).

C—H activation strategies based on Ni catalysis have recently emerged utilizing Ni(0) as a precatalyst source. As an example, Chatani demonstrated the synthesis of isoquinolones from simple amides and alkynes. Simple $PPh_3$ was reported to be the optimal ligand for such purposes; in this case, the inventive Ni(0)-olefin complex also proved an excellent candidate as a Ni(0) source affording excellent yields (FIG. 4*c*. 94%).

To further test the ability of the inventive Ni(0)-olefin complexes as catalysts, the inventors turned their attention to the formation of important C—N bonds. To this end, the inventors capitalized on reports for the amination of aryl halides with both aromatic and aliphatic amines. When SIPr is utilized as ligand, the inventive Ni(0)-olefin complex smoothly afforded the product in excellent yields (FIG. 4*d*. 91%). When aromatic amines were used instead, dppf was used as ligand and smooth conversion to the bis-aromatic amines was obtained (FIG. 4*e*. 90% yield). It is worth pointing out that in this latter example, slightly higher temperatures were required for some Ni-complexes compared to the reported, presumably due to the high stability of the (dppf)Ni(0)(4-$^{CF3}$stb) intermediate (FIG. 3), thus requiring higher energy to promote the dissociation of the stilbene ligand compared to its $Ni(COD)_2$ analog.

Activation of acetals for arylation was recently reported by Doyle. Albeit the presence of protic solvents such as $^t$AmOH, the inventive Ni(0)-olefin complex proved to be an extremely good candidate, obtaining excellent yields of arylation (FIG. 4*f*. 85%). The ability of low-valent Ni species to activate amides through its C—N bond has been demonstrated to be a powerful disconnection for organic synthesis. The inventive Ni(0)-olefin complex bodes well in this context as highlighted by the high yields of ester formation from N-Me-Boc amides with tryptophol (FIG. 4*g*. 65%). The inventive Ni(0)-olefin complex is also amenable to excel as Ni(0) source in powerful alkyl-alkyl Negishi cross-couplings, as exemplified by the 58% yield of C—C bond obtained in FIG. 4*h*. It is worth mentioning that these last two reactions were successfully carried out using terpyridine and PyBOX derivatives as ligands, thus highlighting the facile conversion of the inventive Ni(0)-olefin complex to the active L—Ni(0) species with tridentate ligands.

A Negishi cross-coupling between an aryl bromide and a vinyl zinc reagent catalyzed by of the inventive Ni(0)-olefin complex 2 could achieve similar yields than the corresponding Ni(0) precursors reported (92%, FIG. 4*i*). Ni(0)-olefin complexes have also been utilized as precursors for the generation of heterogeneous Ni(0) particles without the addition of ancillary ligands. In this context, the inventive Ni(0)-olefin complex proved to be an excellent candidate as shown in the reduction of thiomethylethers with silanes (91%, FIG. 4*j*).

Figure 5:
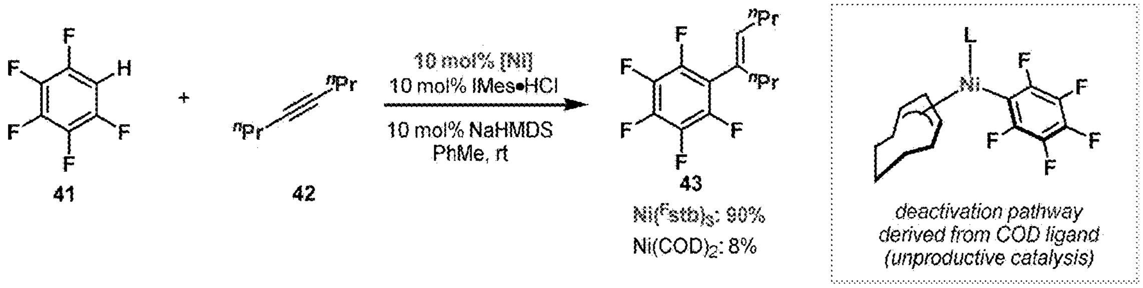

Recently, the use of highly electron-donating ligands such as NHC in combination with $Ni(COD)_2$ has been the catalytic system of choice in the context of hydroarylation strategies via C—H activation. However, it has been noticed that this particular combination of catalyst and ligand leads to the formation of undesired Ni rr-allyl complexes as a consequence of hydrometallation of the COD ligand. Structural evidences and reactivity studies have concluded that such species are preventing catalytic activity and turnover. The inventors envisaged that the inventive Ni(0)-olefin complex could avoid the detrimental pathways observed in certain C—H arylation strategies thus favoring productive catalysis. To test this hypothesis, the inventors examined the direct hydroarylation of alkynes using electron-deficient arenes. As reported, the use of $Ni(COD)_2$ in combination with an IMes afforded traces of hydroarylated product. On the other hand, the use of the inventive Ni(0)-olefin complex 2 reacted smoothly at room temperature and a remarkable 90% yield of product was obtained (FIG. 5). This result highlights the fact that the inventive Ni(0)-olefin complex is competent as a Ni(0) precatalyst and in some instances, it could serve as a unique alternative when COD side reactions occur. It is important to mention that the use of the inventive Ni(0)-olefin complex did not require the use of the highly sensitive free carbene and the simple use of the parent HCl salt in combination with a base sufficed to achieve reactivity.

It is important to mention that in all examples where the inventive Ni(0)-olefin complex is the precatalyst, the reaction setup was performed in an open-air environment and in the bench. Hence, the use of glovebox was dictated by the sensitivity of the optimal ligand for each particular case and in no case by the Ni-olefin precatalyst. Overall, these results highlight the competitiveness of Ni($^X$stb)$_3$ (2-6) to act as an efficient Ni(0) source in a variety of catalytic contexts. Moreover, the good yields obtained when the inventive Ni(0)-olefin complex is operating highlight its modularity when ligands of different chelating nature or nucleophilicity are to be used.

The present invention is explained in more detail with reference to the Figures and Experimental Part.

THE FIGURES ILLUSTRATE

Figure 2:
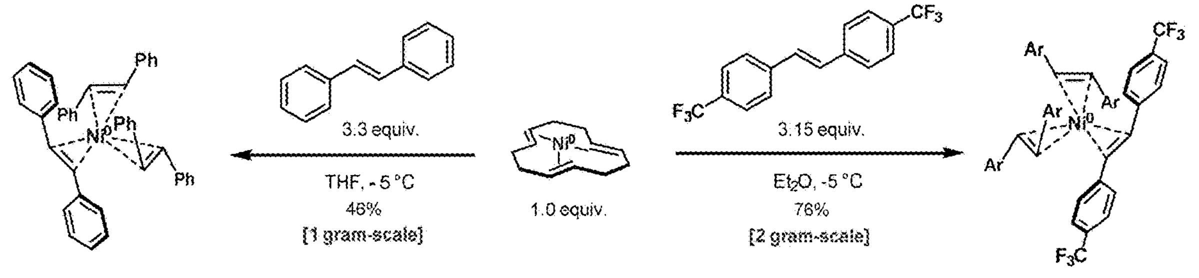

FIG. 1. a: State-of-the-art binary Ni(0) olefin complexes for Ni catalysis.

b: Current strategies to circumvent the air-sensitivity issues related to Ni(0) species;

c: The present Invention as exemplified by Ni($^F$stb)$_3$: an air-stable 16-electron Ni(0)-olefin complex d: Six different inventive Ni($^X$stb)$_3$complexes (1-6), each having a different aryl substituent(s) on each aryl core and their preparation and stability FIG. 2 Synthesis of complexes 1 and 2:

Reaction conditions: all-trans-Ni(CDT) (1.0 equiv.), trans-stilbene or trans-(4-trifluoromethylphenyl)stilbene (3.30 and 3.15 equiv. respectively) at −5° C. in THF or Et2O.

Figure 3:
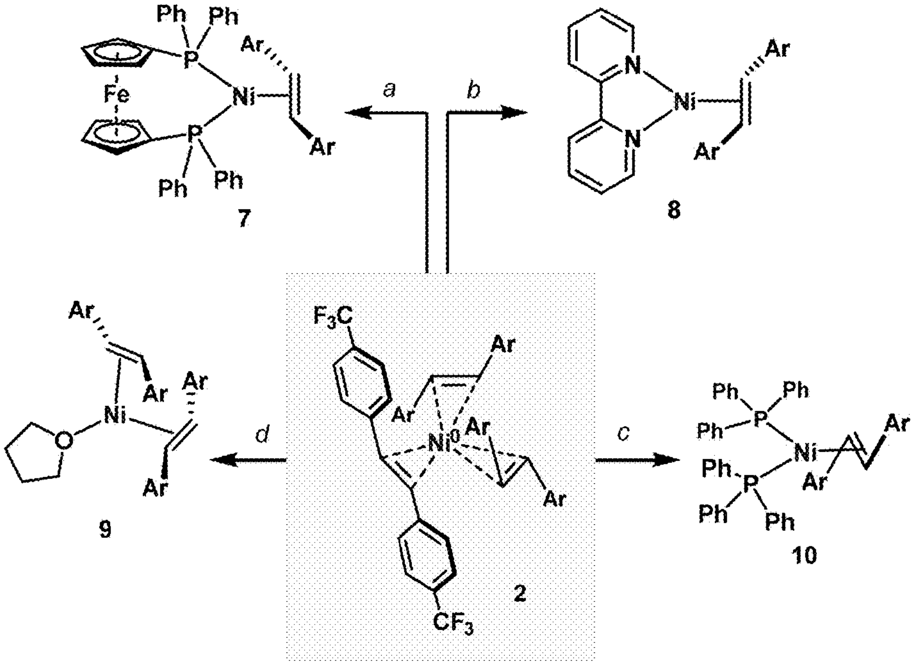

FIG. 3 Ligand exchange of complex 2 with different common ligands in catalysis:

a) 2 (1.0 equiv.), dppf (1.0 equiv.) in THF at 25° C., quantitative;

b) 2 (1.0 equiv.), bipy (1.0 equiv.) in THF at 25° C., quantitative;

c) 2 (1.0 equiv.), $PPh_3$ (2.0 equiv.) in THF at 25° C., quantitative;

d) Slow crystallization of 2 in THF at −78° C. Ar=p-$CF_3$—$C_6H_4$.

Figure 4:
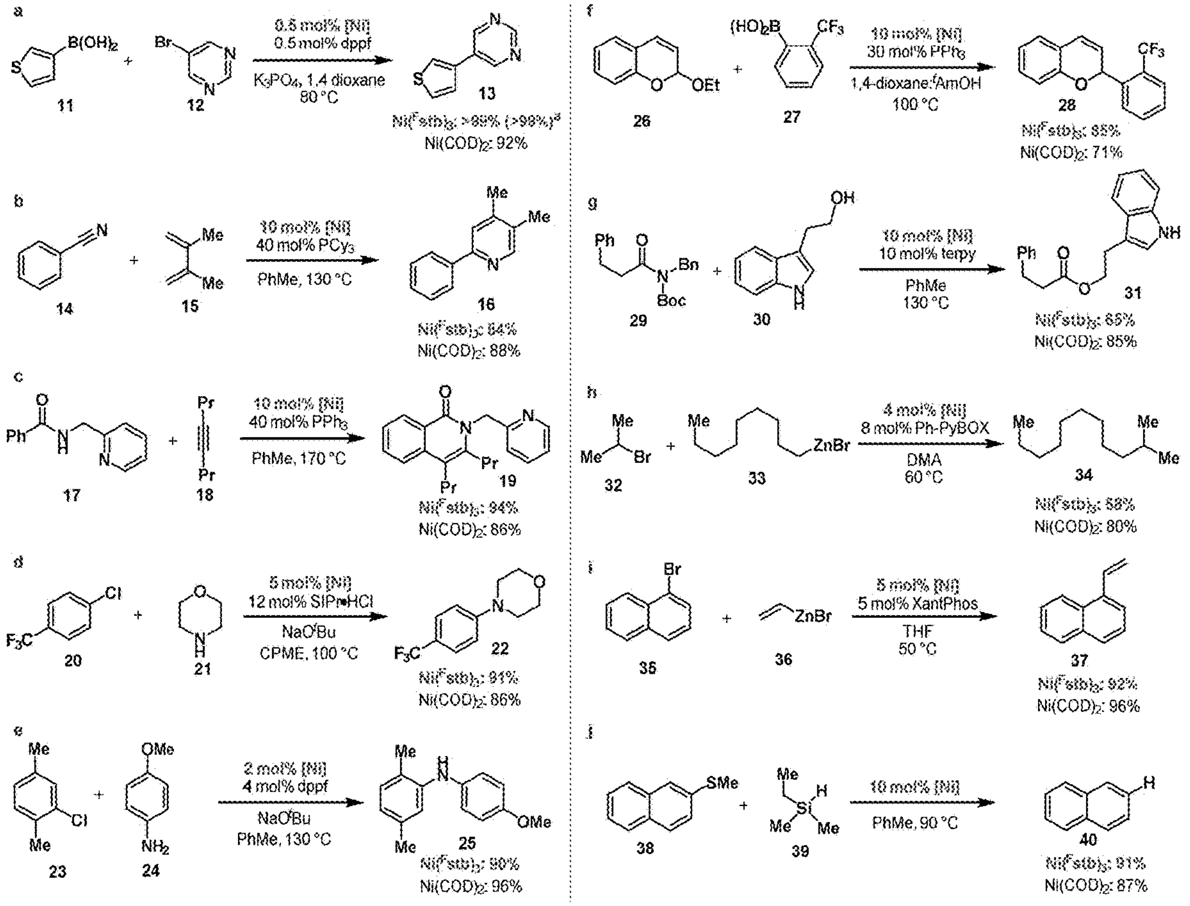

FIG. 4 Catalytic properties of 2 in a variety of Ni-catalyzed transformations. a. Suzuki cross-coupling;

b. Cycloisomerization reaction;

c. C—H activation;

d. Buchwald-Hartwig C—N bond formation with alkylamines;

e. Buchwald-Hartwig C—N bond formation with arylamines;

f. C—O arylation of acetals;

g. Ester formation through C—N bond activation of amides;

h. Alkyl-alkyl cross-coupling;

i. Negishi cross-coupling;

j. C—SMe reduction with silanes.

FIG. 5 Complex 2 avoids traditional COD side-reactions.

Figure 6:
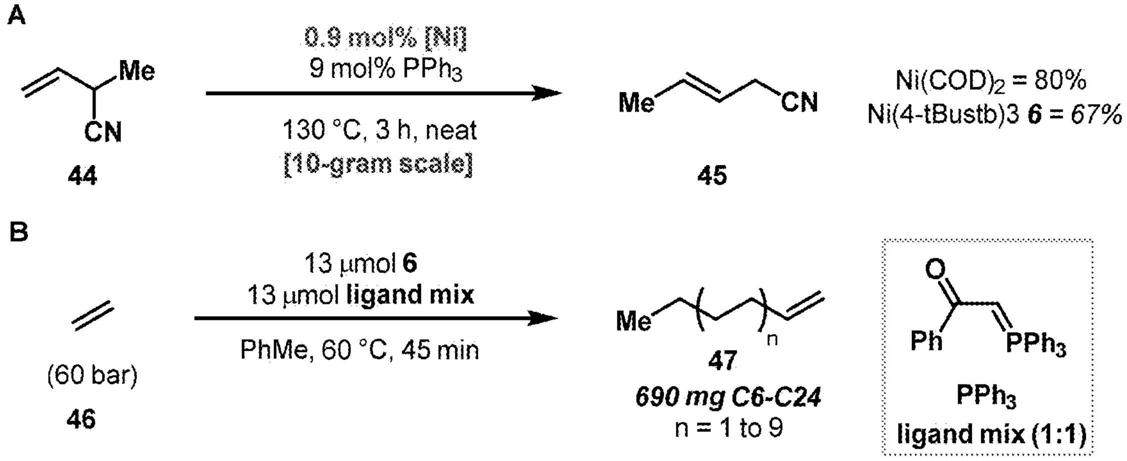
Figure 6:
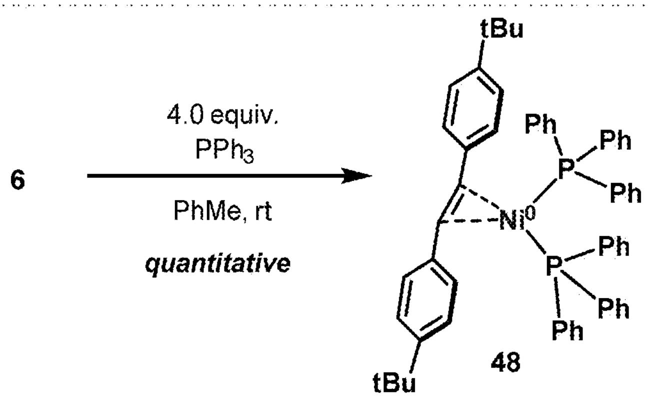

FIG. 6 Illustrations of two industrially relevant transformations and coordination of catalyst 6.

As shown in FIG. 6A, the stability and facility of ligand exchange with other olefins is also demonstrated in two industrially relevant transformations which require Ni(COD)$_2$ in the state of art. As for example shown in FIG. 6A, the Ni-catalyzed isomerization of 2M3BN (2-methyl-3-butenenitrile (44)—in the presence of Ni($^{4\text{-}tBu}$Stb)$_3$ (6) - to 3PN (3-pentenenitrile, (45), which is crucial in the efficient synthesis of adiponitrile from butadiene, this transformation proceeds under neat conditions with the aid of PPh$_3$, and affords comparable levels of reactivity towards 45 (67%). Another process is the Ni-catalyzed SHOP (Shell Higher Olefin Process) (FIG. 6B), which enables the oligomerization of ethylene to obtain higher molecular weight α-olefins. Under un-optimized conditions and without pre-catalyst isolation, complex 6 together with the ligand mixture depicted in FIG. 6B, successfully catalyzed the formation of a mixture of α-olefins in high efficiency. These results highlight the potential of 6 in industrially relevant settings, thus providing an air- and temperature-stable alternative to current Ni(0) catalysts.

Although Ni($^{4\text{-}tBu}$stb)$_3$ (6) might be regarded as an air-stable Ni(COD)$_2$ surrogate, the fundamental coordination chemistry of both complexes differ significantly. For example, when Ni(COD)$_2$ is mixed with 4.0 equiv. of PPh$_3$, an inseparable mixture of Ni(PPh$_3$)$_4$ and (PPh$_3$)$_2$Ni(COD) is commonly obtained (FIG. 6C, top). On the other hand, when 6 is used instead, clean conversion to the 16-electron compound 45 is formed (FIG. 6C, bottom). These differences in coordination chemistry provide an orthogonal tool to existing strategies for the synthesis of well-defined L—Ni(0)-olefin complexes.

General Experimental Notes

Unless otherwise stated, all manipulations were performed using Schlenk techniques under dry argon in heat-gun-dried glassware. Ni($^{X}$stb)$_3$ were stored in a screw cap vial under air in the freezer (−18° C.) except for Ni($^{4\text{-}tBu}$stb)$_3$, which was stored on the bench. All complexes were weight out in air. Anhydrous solvents were distilled from appropriate drying agents and were transferred under Argon: THF, Et$_2$O (Mg/anthracene), CH$_2$Cl$_2$, CH$_3$CN (CaH$_2$), hexanes, toluene (Na/K), Et$_3$N, DMA, 1,4-dioxane (MS), CPME, NMP and tAmOH were purchased in anhydrous grade and were stored over MS. Anhydrous K$_3$PO$_4$, NaOtBu and NaHMDS were stored in a Schlenk or in a glovebox. Flash column chromatography: Merck silica gel 60 (40-63 μm). MS (EI): Finnigan MAT 8200 (70 eV). Accurate mass determinations: MAT 95 (Finnigan). NMR spectra were recorded using a Bruker Avance VIII-300 or Bruker Avance Ill HD 400 MHz spectrometer. $^{1}$H NMR spectra were referenced to the residual protons of the deuterated solvent used. $^{13}$C NMR spectra were referenced internally to the D-coupled $^{13}$C resonances of the NMR solvent. Chemical shifts (δ) are given in ppm, relative to TMS (tetramethylsilane), and coupling constants (J) are provided in Hz. $^{19}$F NMR spectra were referenced externally to the $^{19}$F resonances of CFCl$_3$. $^{31}$P NMR spectra were referenced externally to the $^{31}$P resonances of H$_3$PO$_4$.

General Procedure for the Preparation of (E)-Stilbenes

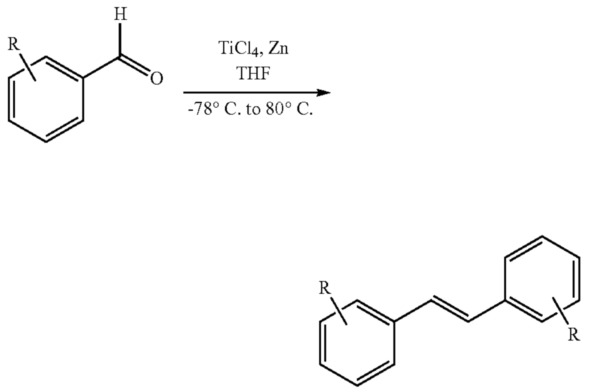

The substituted benzaldehyde (1 equiv.) was added to THF (0.3 M) in a three necked round bottom flask equipped with a large stirring bar and a reflux condenser. The solution was cooled to −78° C. and TiCl$_4$ (1.25 equiv.) was added dropwise. The reaction was allowed to warm to rt and stirred for 10 min. Zn powder (2.5 equiv.) was added in several portions over 2 min. The reaction was refluxed for 3 h and then allowed to cool to rt. Water (1.5×THF amount) was added, followed by HCl (0.1×THF amount, $3_M$). The reaction was stirred for 5 min. and transferred to a separation funnel. The aqueous layer was extracted with MTBE (2×double THF amount), the combined organic layers were washed with sat. aq. NaCl solution and dried over MgSO$_4$. The solvent was evaporated under reduced pressure and the residue was subjected to column chromatography. The purified product was dried under high vacuum.

(E)-1,2-Bis(4-(trifluoromethyl)phenyl)ethane

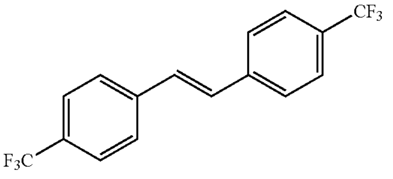 [SMILES: FC(F)(F)c1ccc(/C=C/c2ccc(C(F)(F)F)cc2)cc1]

Prepared according to the general procedure from 4-trifluormethylbenzaldehyde (11.0 mL, 14.0 g, 80.5 mmol), TiCl$_4$ (11.0 mL, 19.0 g, 100.3 mmol, 1.25 equiv.) and Zn powder (13.0 g, 198 mmol, 2.5 equiv.). Column chromatography: gradient hexanes:MTBE (100:0 to 99:1).

Yield: 8.44 g, 26.7 mmol, 66%; colorless solid (E)-1,2-Bis(4-(tert-butyl)phenyl)ethene

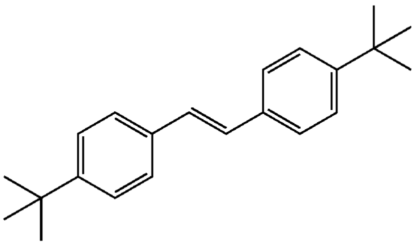 [SMILES: CC(C)(C)c1ccc(/C=C/c2ccc(C(C)(C)C)cc2)cc1]

Prepared according to the general procedure from 4-(tert-butyl)benzaldehyde (10.20 ml, 9.86 g, 60.8 mmol, 1 equiv.), $TiCl_4$ (20.0 mL, 34.6 g, 182.4 mmol, 3 equiv.) and Zn powder (29.8 g, 456 mmol, 7.5 equiv.). Column chromatography: gradient hexanes:MTBE (50:1 to 20:1). Spectroscopic data are in accordance with the literature.

Yield: 3.98 g, 13.6 mmol, 45%; colorless solid (E)-1,2-Bis(4-fluorophenyl)ethane

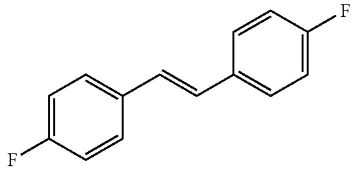 [SMILES: Fc1ccc(/C=C/c2ccc(F)cc2)cc1]

Prepared according to the general procedure from 4-fluorbenzaldehyde (1.30 ml, 1.50 g, 12.09 mmol, 1 equiv.), $TiCl_4$ (1.60 mL, 2.75 g, 14.50 mmol, 1.2 equiv.) and Zn powder (1.98 g, 30.22 mmol, 2.5 equiv.). Column chromatography: 99:1 (hexanes:MTBE). Spectroscopic data are in accordance with the literature.

Yield: 1.28 g, 5.91 mmol, 49%; colorless solid (E)-1,2-Bis(3,5-dimethylphenyl)ethane

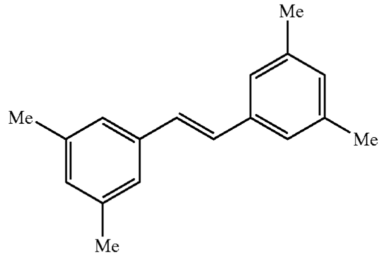 [SMILES: Cc1cc(C)cc(/C=C/c2cc(C)cc(C)c2)c1]

Prepared according to the general procedure from 3,5-Dimethylbenzaldehyde (5.01 ml, 5.00 g, 37.27 mmol, 1 equiv.), $TiCl_4$ (4.90 mL, 8.48 g, 44.72 mmol, 1.2 equiv.) and Zn powder (6.10 g, 93.28 mmol, 2.5 equiv.). Column chromatography: 50:1 (hexanes:MTBE). Spectroscopic data are in accordance with the literature.

Yield: 2960 mg, 18.63 mmol, 67%; colorless solid

Synthesis of (E)-1,2-Di-p-tolylethene

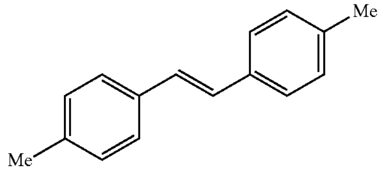 [SMILES: Cc1ccc(/C=C/c2ccc(C)cc2)cc1]

4-Methylstyrene (1.98 mL, 1.77 g, 15 mmol, 1 equiv.) and Grubbs generation II (9.4 mg, 0.015 mmol, 0.1 mol %) were dissolved in DCM (3 mL). The reaction was refluxed for 3 h, the solvent was evaporated under reduced pressure and the solids were purified by column chromatography (pure hexanes). Spectroscopic data are in accordance with the literature.

Yield: 1.1212 g, 5.38 mmol, 72%; colorless solid

Preparation of $Ni(stb)_3$ (1)

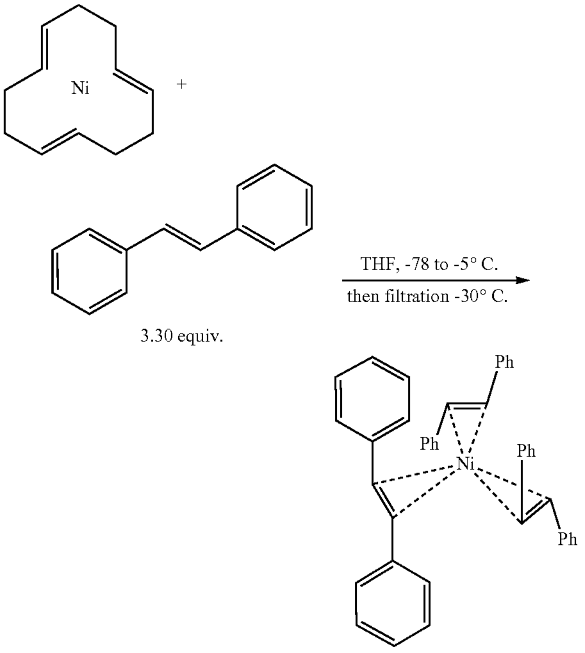

1
46%

A Schlenk tube was charged with Ni(CDT) (CDT=1,5,9-trans,trans,trans-cyclododecatriene) (794 mg, 3.60 mmol) via argon trousers and dissolved in THF (7 mL). The solution was filtered under argon into a Schlenk tube held at −78° C. The filter cake was washed with 3 mL of THF. A separate Schlenk tube was charged with trans-stilbene (2.13 g, 11.87 mmol, 3.30 equiv.) and subjected to one cycle of vacuum/argon. The ligand was suspended in THF (10 mL) and transferred as a suspension to the first Schlenk tube, followed by one wash (2 mL THF) to ensure quantitative transfer. The reaction was stirred at −78° C. for 10 min and was then placed in a cooling bath at −5° C. and stirred at that temperature for 12 h. An argon frit was cooled to −30° C. and the reaction was transferred into the frit. The mixture was allowed to cool down for 1 min and was then filtered with positive pressure of argon. The solid on the frit was dried by passing a flow of argon through the frit. The solid was then transferred to a Schlenk tube and dried further under high vacuum at room temperature to give 1 as an air stable brown-red solid (1.07 g, 1.66 mmol, 46%).

Preparation of Ni($^{4\text{-}CF_3}$stb)$_3$ (2)

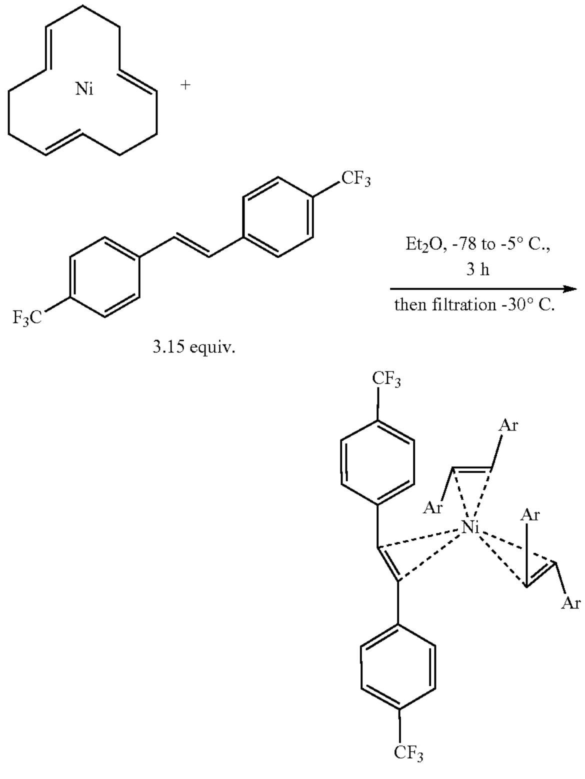

2
70%

Ar = p-$CF_3$—$C_6H_4$

A Schlenk tube was charged with Ni(CDT) (CDT=1,5,9-trans,trans,trans-cyclododecatriene) (610 mg, 2.76 mmol) via argon trousers and fresh Et2O (10 mL) was added at −78° C. to suspend the starting material. A separate Schlenk tube was charged with trans-p$CF_3$-stilbene (2.28 g, 9.12 mmol, 3.15 equiv.) and subjected to one cycle of vacuum/argon. The ligand was suspended in $Et_2O$ (10 mL) and transferred as a suspension to the first Schlenk tube, followed by several washings (3+2+2 mL) to ensure quantitative transfer. The reaction was placed in a cooling bath at −5° C. and stirred at that temperature for 3 h. An argon frit was cooled to −30° C. and the reaction was transferred onto the frit. The reaction was allowed to cool down for 1 min and was then filtered with positive pressure of argon. The solid on the frit was washed with $Et_2O$ (3×2 mL) and dried by passing a flow of argon through the frit. The solid was then transferred to a Schlenk tube and dried further under high vacuum at room temperature to give 2 as an air stable red solid (1.93 g, 1.92 mmol, 70%). The catalyst was stored under air in a freezer.

Preparation of Ni($^{4\text{-}CF_3}$stb)$_3$ from Ni(acac)$_2$

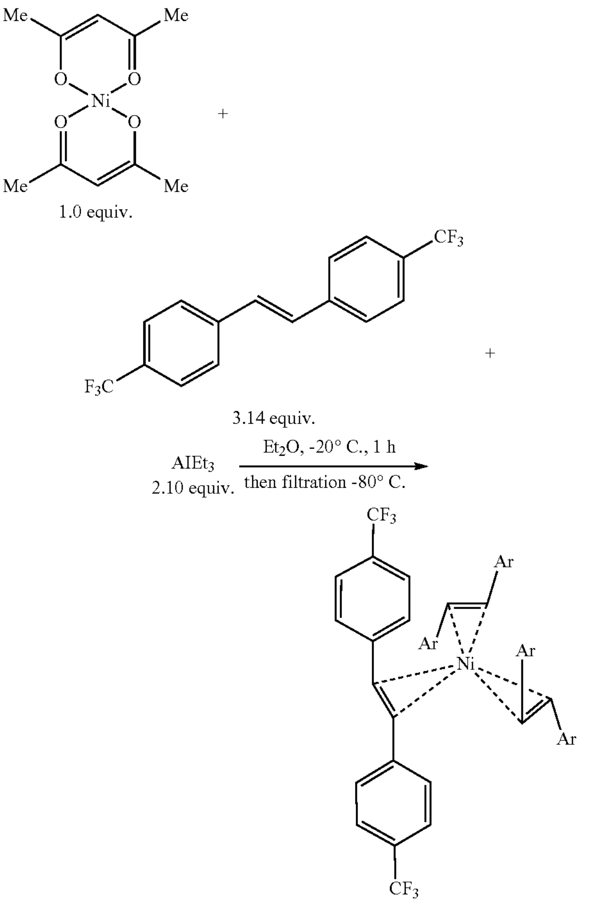

2
61%

Ar = p-$CF_3$—$C_6H_4$

A 100 mL Schlenk tube was charged with anhydrous Ni(acac)$_2$ (904.4 mg, 3.52 mmol) via argon trousers and (E)-1,2-bis(4-(trifluoromethyl)phenyl)ethane (3.50 g, 11.1 mmol, 3.14 equiv.). Diethyl ether (20 mL) was added and the solution was cooled to −20° C. AlEt3 (neat) (1.10 mL, 7.5 mmol, 2.1 equiv.) was dissolved in diethyl ether (5 mL). Then, this solution was added dropwise over 10 min to the Schlenk containing Ni(acac)$_2$ and stilbene ligand. The reaction was stirred at −20° C. for 1 hour and then cooled down in a dry-ice bath (−78° C.) for 10 minutes. The suspension was filtered over a cooled (−78° C.) argon frit, leaving the product on the frit. The solid was washed with diethyl ether (2×2 mL) and dried under high vacuum. Ni($^F$stb)$_3$ was isolated in pure form as a red solid (2.17 g, 2.16 mmol, 61%). The other Ni(0)-complexes were prepared in line with the above process.

Catalytic Reactions 5-(Thiophen-3-yl)pyrimidine (13)

13

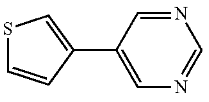

Ni($^{4\text{-}CF_3}$stb)$_3$(2.0 mg, 0.002 mmol, 0.005 equiv.), 5-bromopyrimidine (64.5 mg, 0.406 mmol), thiophen-3-ylboronic acid (102.3 mg, 0.800 mmol, 2 equiv.), dppf (1.1 mg, 0.002 mmol, 0.005 equiv.) and anhydrous $K_3PO_4$ (135 mg, 0.64 mmol, 1.5 equiv.) were placed in a screw cap vial which was subsequently subjected to one cycle of vaccum/argon. 1,4-dioxane (1 mL) was added and the reaction was heated to 80° C. for 8 h. Water was added and the aqueous layer was extracted 3 times with 10 mL $Et_2O$. The combined organic layers were dried with $MgSO_4$ and evaporated under reduced pressure. The crude product was subjected to column chromatography (3:1 to 1:1; Hexanes:EtOAc) to yield 13 in analytically pure form as an white solid (66.7 mg, >99%). The same yield was obtained when a sample of complex 2 was used as precatalyst after storing it for >100 days in the freezer.

4,5-Dimethyl-2-phenylpyridine (16)

16

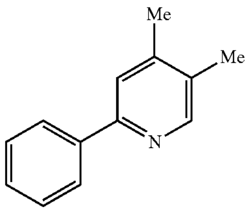

Ni($^{4\text{-}CF_3}$stb)$_3$ (50.4 mg, 0.05 mmol, 0.1 equiv.) was placed in a pressure tight Schlenk tube which was sealed and subjected to one cycle of vacuum/argon. The Schlenk tube was transferred to the glovebox $PCy_3$ (56.1 mg, 0.2 mmol, 0.4 equiv.) was added and the Schlenk was taken out of the glovebox again. Toluene (3 mL) was added followed by 2,3-dimethylbuta-1,3-diene (226.3 μL, 164.3 mg, 2 mmol, 4 equiv.) and benzonitrile (51.1 μL, 51.6 mg, 0.5 mmol). The Schlenk tube was sealed pressure tight and heated to 130° C. for 48 h. The solvent was removed under reduced pressure and the crude product was purified by column chromatography (9:1 to 5:1; Hexanes:EtOAc) to yield 16 as an yellow oil (76.7 mg, 0.419 mmol, 84%).

3,4-Dipropyl-2-(pyridin-2-ylmethyl)isoquinolin-1(2H)-one (19)

19

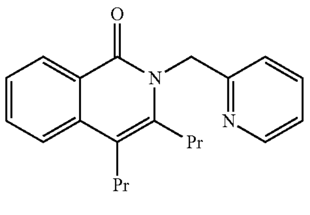

A 10-mL pressure-tight Schlenk tube was charged with N-(pyridin-2-ylmethyl)benzamide (106.1 mg, 0.50 mmol), $PPh_3$ (52.5 mg, 0.20 mmol, 0.4 equiv.), 4-octyne (0.22 mL, 1.50 mmol, 3.0 equiv.) and Ni($^{4\text{-}CF_3}$stb)$_3$ (50.4 mg, 0.05 mmol, 0.1 equiv.). Dry toluene (2 mL) was added and the reaction mixture was placed into a preheated oil bath at 170° C. and stirred for 20 h. After cooling to room temperature, the solvent was removed under reduced pressure. Purification of the crude residue via column chromatography (1:1; Hexanes:EtOAc) afforded pure 19 (151 mg, 0.47 mmol, 94%) as a yellowish oil.

4-(4-(Trifluoromethyl)phenyl)morpholine (22)

22

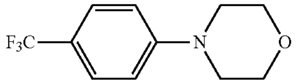

A 12 mL screw-cap vial was charged with Ni($^{4\text{-}CF_3}$stb)$_3$ (27.2 mg, 0.027 mmol, 0.05 equiv.), SIPr·HCl (26.8 mg, 0.063 mmol, 0.116 equiv.) and dry CPME (1.5 mL). 4-chlorobenzotrifluoride (72 μL, 0.540 mmol, 1.00 equiv.) and morpholine (57 μL, 0.648 mmol, 1.20 equiv.) were added to the solution. While stirring the solution for 15 min at room temperature the mixture became orange-yellowish. NaOtBu (2 M in THF, 543 μL, 1.080 mmol, 2.00 equiv.) was then added and the brown reaction mixture was stirred for 4 h in a preheated oil bath at 100° C. After cooling to room temperature the solvent was removed under reduced pressure. Column chromatography of the crude residue (9:1; Hexanes:EtOAc) afforded 22 (114 mg, 0.493 mmol, 91% yield) as a colorless solid.

N-(4-Methoxyphenyl)-2,5-dimethylaniline (825)

25

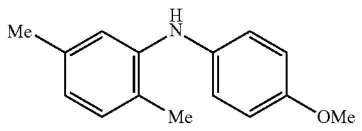

A 12 mL screw-cap vial was charged with Ni($^{4\text{-}CF_3}$stb)$_3$ (20.1 mg, 0.02 mmol, 0.02 equiv.), dppf (22.2 mg, 0.04 mmol, 0.04 equiv.) and anhydrous sodium t-butoxide (134.5 mg, 1.40 mmol, 1.40 equiv.). Toluene (2 mL) was added followed by 2-chloro-p-xylol (0.134 mL, 1.00 mmol, 1.00 equiv.) and p-anisidine (147.8 mg, 1.20 mmol, 1.20 equiv.). Additional toluene (2 mL) was added and the vial was set into a preheated oil bath at 130° C. and stirred for 48 h. After cooling to room temperature the reaction mixture was diluted with EtOAc and water was added and the layers were separated. The aqueous layer was extracted with EtOAc and the combined organic layers were dried over $MgSO_4$. The solvent was removed under reduced pressure, and the crude residue was purified via column chromatography (gradient: 50:1 to 20:1; Hexanes:EtOAc) to afford 25 as an orange oil (205.1 mg, 0.90 mmol, 90% yield).

2-(2-(Trifluoromethyl)phenyl)-2H-chromene (28)

28

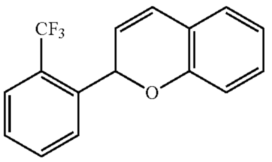

A 12 mL screw cap vial was charged with Ni($^{4\text{-}CF_3}$stb)$_3$ (58.6 mg, 0.05 mmol, 0.09 equiv.) and $PPh_3$ (39.3 mg, 0.15 mmol, 0.27 equiv.). 1,4 dioxane (1 ml) was added and the solution was stirred for 5 min. A 50 mL Schlenk tube was charged with 2-ethoxy-2H-chromene (98.9 mg, 0.56 mmol), (2-(trifluoromethyl)phenyl)boronic acid (189.9 mg, 1.00 mmol, 1.78 equiv.), dioxane (23 mL) and t-AmOH (2 mL). The catalyst+ligand solution was transferred two the second Schlenk tube and the reaction was placed in a preheated oil bath at 100° C. for 40 min. The reaction as allowed to cool down and the solvents were evaporated under reduced pressure. The residue was subjected to column chromatography (pure hexanes) to give pure 28 as a colorless oil (131.9 mg, 0.56 mmol, 85%).

2-(1H-Indol-3-yl)ethyl 3-phenylpropanoate (31)

31

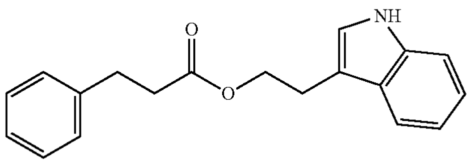

A 12 mL screw-cap vial was charged with Ni($^{4\text{-}CF_3}$stb)$_3$ (20.1 mg, 0.02 mmol, 0.1 equiv.), terpyridine (4.7 mg, 0.02 mmol, 0.1 equiv.), tert-butyl benzyl(3-phenylpropanoyl)carbamate (67.9 mg, 0.20 mmol, 1.00 equiv.) and tryptophol (40.3 mg, 0.25 mmol, 1.25 equiv.). Toluene (0.2 mL) was added and the vial was set into a preheated oil bath at 130° C. After stirring for 23 h the solution was allowed to cool to room temperature and the contents were transferred with EtOAc and hexanes into a round-bottomed flask. The solvent was removed under reduced pressure and the crude residue was purified via column chromatography (7:1; Hexanes/EtOAc) to afford 31 as an orange oil (38.5 mg, 0.13 mmol, 65% yield).

2-Methylundecane (34)

34

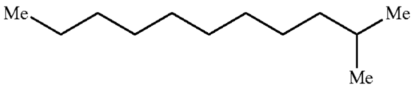

A 12 mL screw-cap vial was charged with Ni($^{4\text{-}CF_3}$stb)$_3$ (10.0 mg, 0.010 mmol, 0.04 equiv.) and 2,6-bis((R)-4-phenyl-4,5-dihydrooxazol-2-yl)pyridine (7.4 mg, 0.020 mmol, 0.08 equiv.). DMA (0.4 mL) was added under argon, the deep-blue solution was stirred for 10 min at room temperature and tetradecane (internal standard for GC analysis, 20 μL, 0.077 mmol) was added. The mixture was stirred for further 10 min. at room temperature and a solution of n-nonylzinc bromide (0.85 M in DMA, 0.47 mL, 0.400 mmol, 1.57 equiv.) and i-propyl bromide (24 μL, 0.256 mmol, 1.00 equiv.) were added. After stirring the reaction mixture for 20 hours at 60° C. a 58% yield of 34 was determined by GC-FID analysis.

1-Vinylnaphthalene (37)

37

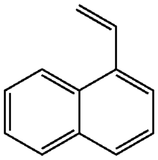

A screw cap vial was charged with Ni($^{4\text{-}CF_3}$stb)$_3$ (10.1 mg, 0.01 mmol, 0.05 equiv.) once cycle of vacuum/argon was performed and the vial was transferred to a glovebox. Xantphos (5.8 mg, 0.01 mmol, 0.05 equiv.) was added and the vial was removed from the glovebox. THF (150 μL), 1-bromonaphthalene (28.0 μL, 41.4 mg, 0.2 mmol) and vinylzincbromide (1M in THF/NMP, 350 μL, 1.75 equiv.) were added. The reaction was heated to 50° C. for 5 h and was subsequently diluted with EtOAc. Mesitylene (25 μL 21.6 mg) was added as internal standard and a 92% yield of 37 was determined via GC-FID analysis.

Naphtalene (40)

40

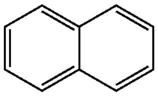

A 12 mL screw-cap vial was charged with 2-(methylthio) naphthalene (87.2 mg, 0.50 mmol, 1.0 equiv.) and Ni($^{4\text{-}CF_3}$stb)$_3$ (50.4 mg, 0.05 mmol, 0.1 equiv.). n-Dodecane (internal standard for GC analysis, 20 μL, 0.09 mmol), $EtMe_2SiH$ (0.13 mL, 0.98 mmol, 2.0 equiv.) and toluene (2 mL) were added. The vial was set into a preheated oil bath at 90° C. and kept stirring for 14 hours. After cooling to room temperature the mixture was diluted with EtOAc (4 mL) and a 91% yield of 40 was determined via GC-FID analysis.

1,2,3,4,5-Pentafluoro-6-(oct-4-en-4-yl)benzene (43)

43

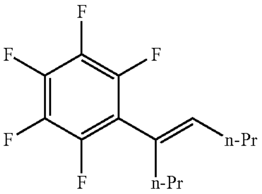

A screw cap vial was charged with Ni($^{4\text{-}CF_3}$stb)$_3$ (20.1 mg, 0.02 mmol, 0.1 equiv.) IMes HCl (6.8 mg, 0.02 mmol, 0.1 equiv.) and anhydrous NaHMDS (3.6 mg, 0.02 mmol, 0.1 equiv.). Toluene (1.5 mL) was added and the mixture was stirred for 5 min. 1,2,3,4,5-pentafluorobenzene (22.2 μL, 33.6 mg, 0.2 mmol) and 4-octin (44.0 μL, 33.1 mg, 0.3 mmol, 1.5 equiv.) were added and toluene (0.5 mL) was used to wash the substrates down. The reaction as stirred at rt for 3 h and was quenched by addition of $CH_2Cl_2$. The mixture was filtered over a plug of silica and evaporated to dryness. α,α,α-Trifluortoluol (24.6 μL, 29.2 mg, 0.2 mmol, 1.0 equiv.) was added as internal standard and the yield (90%) was determined by $^{19}F$ NMR. As stated above, a long-standing problem in the area of Ni catalysis has been solved by providing the inventive complex as a Ni(0) precatalyst which mimics the remarkable reactivity of $Ni(COD)_2$ but has the advantages of being robust, air-stable and easy to handle in open-flask conditions. Herein, the inventors reported the synthesis and characterization of a binary Ni(0)-olefin complex that fulfills all these requirements and permits Ni catalysis without the use of complex Schlenk techniques or gloveboxes. The inventive Ni(0)-olefin complex $Ni(R)_3$ is a unique example of a modular Ni(0)-olefin complex which has remarkable stability under air and benefits from a high reactivity in solution due to its 16-electron configuration. Its catalytic abilities have been benchmarked with those of $Ni(COD)_2$ and the inventors have shown that $Ni(R)_3$ is an excellent precatalyst in a range of Ni-catalyzed transformations. Differently than the common air-stable precursors based on Ni(II) complexes, $Ni(R)_3$ is characterized by its intrinsic ability to deliver Ni(0) species in solution and afford discrete and well-defined Ni(0)—Ligand complexes. The great performance of $Ni(R)_3$ as Ni(0) precatalyst is envisaged to rapidly expand to all areas of Ni catalysis thus permitting facile setups and accelerating the discovery of new reactivity.

(E)-Pent-3-enenitrile (45

45

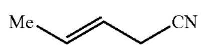

This compound was prepared following a literature procedure but replacing $Ni(COD)_2$ by complex 6. A Schlenk tube was charged with $Ni(^{4\text{-}tBu}stb)_3$ (1.04 g, 1.11 mmol, 0.9 mol %) and $PPh_3$ (2.91 g, 11.1 mmol, 9 mol %). 2-methylbut-3-enenitrile (12.5 ml, 10.0 g, 123.3 mmol, 1 equiv.) was added and the reaction was heated to 100° C. for 3 h. After allowing the reaction to cool to room temperature, the solution was opened to air and transferred to a round-bottom flask with non-dry toluene. A distillation was attempted, but failed due to the close boiling points of the product and three if it's isomers. All fractions were combined with the residue of the distillation and $CH_2Br_2$ (8.65 mL, 21.43 g, 123.3 mmol, 1 equiv.) was added as internal standard. The yield was determined by NMR: 67% (6.70 g, 82.6 mmol).

α-Olefins $C_6$ to $C_{22}$

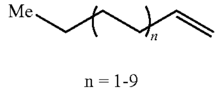

n = 1-9

These compounds were prepared adopting a literature procedure but replacing $Ni(COD)_2$ by complex 6. A 50 mL steel autoclave with a glass inlet was set under argon. A Schlenk tube was charged with $Ni(^{4\text{-}tBu}stb)_3$ (12.2 mg, 0.013 mmol, 1 equiv.), 1-phenyl-2-(triphenyl-$\lambda^5$-phosphanylidene)ethan-1-one (4.9 mg, 0.013 mmol, 1 equiv.) and $PPh_3$ (3.4 mg, 0.013 mmol, 1 equiv.). The solids were dissolved in toluene (20 mL) and transferred to the autoclave with a syringe. The autoclave was pressured with 5 bars of ethylene gas and stirred for 15 h at 25° C. The autoclave was then pressurized with 60 bars of ethylene and heated to 60° C. for 45 min. The reaction exhibited exothermic properties, leading to rising pressure and temperature with a peak at 80 bars and 75° C. internal temperature. The autoclave was allowed to reach room temperature and the pressure was released. 1-Undecene (200 μL, 150 mg) was added as internal standard and a GC sample was prepared (filtration over plug of silica, eluting with pentane).

Result of GC Analysis:

| #carbons | mass | mmol | turnovers needed | mmol ethylene |
|---|---|---|---|---|
| 6 | 72.0 | 0.856 | 3 | 2.57 |
| 8 | 125.1 | 1.115 | 4 | 4.46 |
| 10 | 97.1 | 0.692 | 5 | 3.46 |
| 12 | 83.4 | 0.495 | 6 | 2.97 |
| 14 | 70.8 | 0.361 | 7 | 2.53 |
| 16 | 65.5 | 0.292 | 8 | 2.34 |
| 18 | 68.1 | 0.270 | 9 | 2.43 |
| 20 | 55.0 | 0.196 | 10 | 1.96 |
| 22 | 52.9 | 0.171 | 11 | 1.88 |
| SUM | 689.9 | | | 24.59 |

$Ni(PPh_3)_2(^{4\text{-}tBu}stb)$ (48)

48

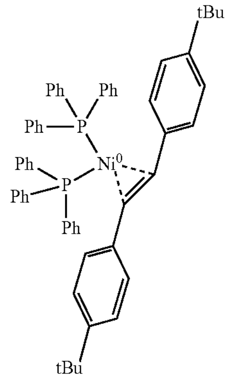

$Ni(^{4\text{-}tBu}stb)_3$ (46.8 mg, 0.05 mmol, 1 equiv.) and $PPh_3$ (52.4 mg, 0.2 mmol, 4 equiv.) were dissolved in $d_8$-toluene (1 mL) and transferred to an NMR tube. Analysis by $^{31}P$ NMR shows a 1:1 mixture of and complex 48 and 2 equiv. of free $PPh_3$. Following the same procedure $Ni(COD)_2$ (13.8 mg, 0.05 mmol, 1 equiv.) and $PPh_3$ (52.4 mg, 0.2 mmol, 4 equiv.) were dissolved in d8-toluene (1 mL) and analyzed by $^{31}P$ NMR. A 1:3 mixture of $Ni(COD)(PPh_3)_2$ and $Ni(PPh_3)_4$ Summarizing the above, the present invention presents the synthesis of a family of air-stable 16-electron tris-olefin-Ni(0) complexes which differ on their substitution in the aryl rings of the supporting stilbenes, and their use in various catalytic applications. A systematic study of these substituents enabled the inventors to establish that the origin of the high stability towards oxidation is the result of a steric demand inferred by the substituents preferably at the para position of the stilbene ligands. This fundamental observation proved to be a superior Ni(0) source with remarkable physical properties. The inventive complexes, depending on their actual substitution on the aryl residue, provide faster kinetic profiles, broader catalytic performance and have been shown to perform, in most of the applications, at the same level than $Ni(COD)_2$ in challenging catalytic transformations. The high resemblance in reactivity to $Ni(COD)_2$, the broad applicability, high practicality and robustness of the inventive complexes will find rapid application in the field of Ni catalysis.

The invention claimed is:

1. An air-stable $Ni(R)_3$—complex wherein Ni represents Ni(0) and R is the same or different and represents a trans-stilbene of the Formula (I):

(I)

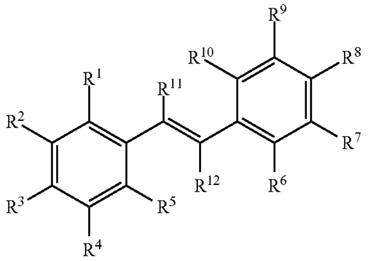

wherein in Formula (I), $R^3$ and $R^8$ are the same or different and are selected from $C_1$ to $C_8$ perfluoro alkyl and the others of $R^1$ to $R^{10}$ are hydrogen, and $R^{11}$ to $R^{12}$ may be the same or different and are selected from H, $C_1$ to $C_6$ alkyl, O—$C_1$ to $C_6$ alkyl, $C_3$ to $C_6$ cycloalkyl, or —O—$C_3$ to $C_6$ cycloalkyl; or, wherein in Formula (I), $R^3$ and $R^8$ are each $C_1$ to $C_8$ perfluoro alkyl and the others of $R^1$ to $R^{10}$ and $R^{11}$ to $R^{12}$ are hydrogen; or, wherein in Formula (I), $R^3$ and $R^8$ are each —$CF_3$, and the others of $R^1$ to $R^{10}$ and $R^{11}$ to $R^{12}$ are hydrogen.

2. Process for preparing an air-stable $Ni(R)_3$—complex wherein Ni represents Ni(0) and R are the same or different and represents a trans-stilbene of the Formula (I):

(I)

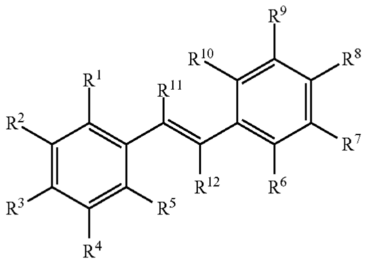

wherein in Formula (I), $R^3$ and $R^8$ are the same or different and are selected from $C_1$ to $C_8$ perfluoro alkyl and the others of $R^1$ to $R^{10}$ are hydrogen, and $R^{11}$ to $R^{12}$ may be the same or different and are selected from H, $C_1$ to $C_6$ alkyl, O—$C_1$ to $C_6$ alkyl, $C_3$ to $C_6$ cycloalkyl, or —O—$C_3$ to $C_6$ cycloalkyl; or, wherein in Formula (I), $R^3$ and $R^8$ are each $C_1$ to $C_8$ perfluoro alkyl and the others of $R^1$ to $R^{10}$ and $R^{11}$ to $R^{12}$ are hydrogen; or, wherein in Formula (I), $R^3$ and $R^8$ are each —$CF_3$, and the others of $R^1$ to $R^{10}$ and $R^{11}$ to $R^{12}$ are hydrogen, said process comprising reacting a Nickel (II) compound, selected from $NiF_2$, $NiCl_2$, $NiBr_2$, $NiI_2$, $Ni(OTf)_2$, $Ni(BF_4)_2$, $Ni(OTs)_2$, $Ni(glyme)Cl_2$, $Ni(glyme)Br_2$, $Ni(diglyme)Cl_2$, $Ni(diglyme)Br_2$, $Ni(NO_3)_2$, $Ni(OR^{13})_2$ (where $R^{13}$ represents-C(O)—$C_1$-$C_6$-alkyl which is optionally substituted with one of more halogen), Ni(acetyl acetonate)$_2$, $Ni(Ac)_2$, or mixtures thereof, with at least three equivalents of the trans-stilbene of Formula (I) in the presence of at least two equivalents of an aluminum alkyl of the Formula $Al(R^{14})_3$, wherein $R^{14}$ may be the same or different and is selected from $C_1$ to $C_6$ alkyl or $C_3$ to $C_6$ cycloalkyl.

3. Process for preparing an air-stable $Ni(R)_3$—complex according to claim 2 wherein the aluminum alkyl of the Formula $Al(R^{14})_3$ is selected from $Al(CH_3)_3$ or $Al(C_2H_5)_3$.

4. Method comprising conducting an organic synthesis in a reactor and further comprising introducing to the reactor an air-stable $Ni(R)_3$—complex according to claim 1 as catalyst or precatalyst, wherein:

Ni represents Ni(0) and R are the same or different and represents a trans-stilbene of the Formula (I):

(I)

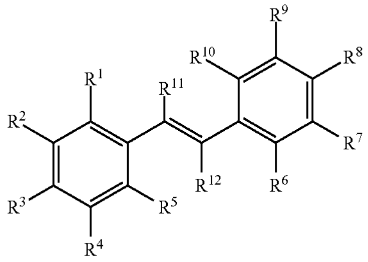

wherein in Formula (I), $R^3$ and $R^8$ are the same or different and are selected from $C_1$ to $C_8$ perfluoro alkyl and the others of $R^1$ to $R^{10}$ are hydrogen, and $R^{11}$ to $R^{12}$ may be the same or different and are selected from H, $C_1$ to $C_6$ alkyl, O—$C_1$ to $C_6$ alkyl, $C_3$ to $C_6$ cycloalkyl, or —O—$C_3$ to $C_6$ cycloalkyl; or, wherein in Formula (I), $R^3$ and $R^8$ are each $C_1$ to $C_8$ perfluoro alkyl and the others of $R^1$ to $R^{10}$ and $R^{11}$ to $R^{12}$ are hydrogen; or, wherein in Formula (I), $R^3$ and $R^8$ are each —$CF_3$, and the others of $R^1$ to $R^{10}$ and $R^{11}$ to $R^{12}$ are hydrogen.

* * * * *